United States Patent
Dey et al.

(10) Patent No.: US 10,530,896 B2
(45) Date of Patent: Jan. 7, 2020

(54) CONTEXTUAL REMOTE MANAGEMENT OF VIRTUAL APP LIFECYCLE

(71) Applicant: International Business Machines Corporation, Armonk, NY (US)

(72) Inventors: Kuntal Dey, New Delhi (IN); Vijay Ekambaram, Tamilnadu (IN); Enara C. Vijil, Croton on Hudson, NY (US)

(73) Assignee: International Business Machines Corporation, Armonk, NY (US)

(*) Notice: Subject to any disclaimer, the term of this patent is extended or adjusted under 35 U.S.C. 154(b) by 427 days.

(21) Appl. No.: 15/052,091

(22) Filed: Feb. 24, 2016

(65) Prior Publication Data
US 2017/0242553 A1  Aug. 24, 2017

(51) Int. Cl.
*G06F 3/048* (2013.01)
*H04L 29/06* (2006.01)
(Continued)

(52) U.S. Cl.
CPC .............. *H04L 67/42* (2013.01); *G06F 8/61* (2013.01); *G06F 8/62* (2013.01); *G06F 9/44505* (2013.01); *G06F 9/451* (2018.02); *G06Q 30/00* (2013.01); *G06Q 50/01* (2013.01); *H04L 12/4625* (2013.01); *H04L 67/22* (2013.01); *H04L 67/306* (2013.01)

(58) Field of Classification Search
None
See application file for complete search history.

(56) References Cited

U.S. PATENT DOCUMENTS 8,224,766 B2   7/2012  Skibiski et al.
8,233,408 B2   7/2012  Lu et al.
(Continued)

FOREIGN PATENT DOCUMENTS

WO   2012126741   9/2012
WO   2014142894   9/2014
WO   2014161323   10/2014

OTHER PUBLICATIONS

Andrus, J., et al., "Cells: A Virtual Mobile Smartphone Architecture", Symposium on Operating Systems Principles, Oct. 23-26, 2011, pp. 1-15.
(Continued)

*Primary Examiner* — Andrey Belousov
*Assistant Examiner* — Haimei Jiang
(74) *Attorney, Agent, or Firm* — Fleit Intellectual Property Law; Thomas S. Grzesik

(57) ABSTRACT

Systems and methods for managing app lifecycles on a user device. A user device context is determined and a set of server based apps associated with the context is determined based on the context and a set of conditions associated with server based apps. An indicator for user interface elements for each server based app is sent with the indication of the context. These user interface elements are displayed to a user of the device. In an example, these user interface elements are displayed on a default pane of the device. A user interface element in some examples is able to be selected by a single interaction. Interactions between a user and a user interface for a selected app are received at a. The user interactions are processed to produce results based on the user interface inputs, and the results are sent.

20 Claims, 9 Drawing Sheets

(51) Int. Cl.
    *G06Q 30/00*           (2012.01)
    *G06F 8/61*             (2018.01)
    *G06F 9/445*            (2018.01)
    *H04L 12/46*           (2006.01)
    *G06F 9/451*            (2018.01)
    *G06Q 50/00*           (2012.01)
    *H04L 29/08*           (2006.01)

(56) References Cited

U.S. PATENT DOCUMENTS

| | | | |
|---|---|---|---|
| 8,751,743 B2 | 6/2014 | Burge, III | |
| 8,959,098 B2 | 2/2015 | Skibiski et al. | |
| 2010/0041391 A1* | 2/2010 | Spivey | H04W 12/10 |
| | | | 455/425 |
| 2011/0137895 A1* | 6/2011 | Petrou | G06F 17/30241 |
| | | | 707/723 |
| 2011/0208797 A1 | 8/2011 | Kim | |
| 2011/0302302 A1* | 12/2011 | Min | G06F 8/61 |
| | | | 709/224 |
| 2011/0320318 A1* | 12/2011 | Patel | G06Q 30/02 |
| | | | 705/26.62 |
| 2012/0269116 A1* | 10/2012 | Xing | G06F 17/3064 |
| | | | 370/328 |
| 2013/0007203 A1 | 1/2013 | Szu | |
| 2013/0040626 A1* | 2/2013 | Morgaine | H04W 4/00 |
| | | | 455/418 |
| 2013/0097518 A1* | 4/2013 | Pearcy | G06F 9/542 |
| | | | 715/741 |
| 2013/0346217 A1 | 12/2013 | Pandey et al. | |
| 2014/0199663 A1 | 7/2014 | Sadeh-Koniecpol et al. | |
| 2015/0011187 A1 | 1/2015 | Wetzold | |
| 2015/0081764 A1 | 3/2015 | Zhao et al. | |
| 2015/0189377 A1* | 7/2015 | Wheatley | H04N 21/44218 |
| | | | 725/12 |
| 2016/0048568 A1* | 2/2016 | Silverberg | G06F 17/3087 |
| | | | 707/734 |
| 2016/0232314 A1* | 8/2016 | Hsieh | G06F 19/3406 |
| 2016/0374577 A1* | 12/2016 | Baxi | A61B 5/0402 |
| | | | 600/384 |

OTHER PUBLICATIONS

List of IBM Patents or Applications Treated as Related.

\* cited by examiner

CONTEXTUAL REMOTE MANAGEMENT OF VIRTUAL APP LIFECYCLE

BACKGROUND

The present disclosure generally relates to the field of management of applications on a device, and more particularly to remotely managing the lifecycle of applications based on context information relating to a user of the device.

User computing equipment, such as cellular phones, personal electronic device, and the like, are increasingly able to host applications to provide useful services or information to a user. The usefulness of having dedicated applications, or "apps," on a user device has led to an increase in the number of apps that are of interest to a user.

BRIEF SUMMARY

A method on a server includes determining a first context for a user's device, where the first context being a context of the user's device at a timepoint. The method further includes determining, based on the first context and a respective set of context related conditions associated with each server based app within at least one server based app, a first set of server based apps associated with the first context. The method also includes sending, in association with the indication of the first context, a respective indicator of a respective user interface element for each server based app within the first set of server based apps. The method further includes receiving, at a server from the user's device based on sending the respective indicator, user interface inputs associated with a selected user interface for a selected app within the first set of server based apps. The method additionally includes processing, based on receiving the user interface inputs, the user interface inputs to produce results based on the user interface inputs. The method further includes sending, based on the producing, the results.

In one example, a method on a user device includes determining a present user device context and receiving, from a remote processor, a respective indicator of a respective user interface element associated with each respective server based app within a first set of server based apps. Each respective indicator indicating a user interface element to display for selection of its associated server based app. The method further includes receiving, in association with the first set of server based apps, an indication of a device context and determining that the present user device context matches the indication of a device context. The method further includes displaying, based on receiving the respective indicator and based on determining that the present user device context matches the indication of a device context, the respective user interface element associated with each server based app within the first set of server based apps. In an example, the respective user interface elements are displayed on a display along with other user interface elements. The method also includes receiving, based on displaying the respective user interface element, a selection of a selected user interface element that is associated with a selected server based app. In an example, this selection is able to be made by a single interaction with the selected user interface element. The selected server based app executing on the remote processor and interacting with a user interface components of the user device. The method also includes presenting on a display of the user device, based on the selection, a user interface for the selected server based app. The method further includes exchanging with the remote processor, in conjunction with the user interface, information between the selected server based app executing on the remote processor and user interface components of the user device.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which.

DETAILED DESCRIPTION

The below described system and method operate to provide an improved user's experience when using a mobile device to access information or perform other communications associated with businesses or other entities that are relevant to the user's context. In an example, a context of a user's device, and therefore a context associated with a user of that device, is determined. Based on this determined context, processes on a remote server, such as within a cloud based computing infrastructure, performs lifecycle management of various special purpose processing applications, referred to herein as "apps," on that user's device. In an example, such lifecycle management is able to include installation, management, operational support, and de-installation of one or more capabilities on the user device. These capabilities in one example are server based apps that allow a user to perform processing, access data, perform other tasks, or combinations of these, via the user interface of the user device. In an example, a server based app is enabled on the user device by providing a user interface on the device that communicates with, and exchanges data with, a remote computing device such as a server or other cloud based infrastructure. The cloud based infrastructure in an example is able to perform processing, data storage, other operational support, or combinations of these, based on the user interface provided on the user's device.

Figure 1:
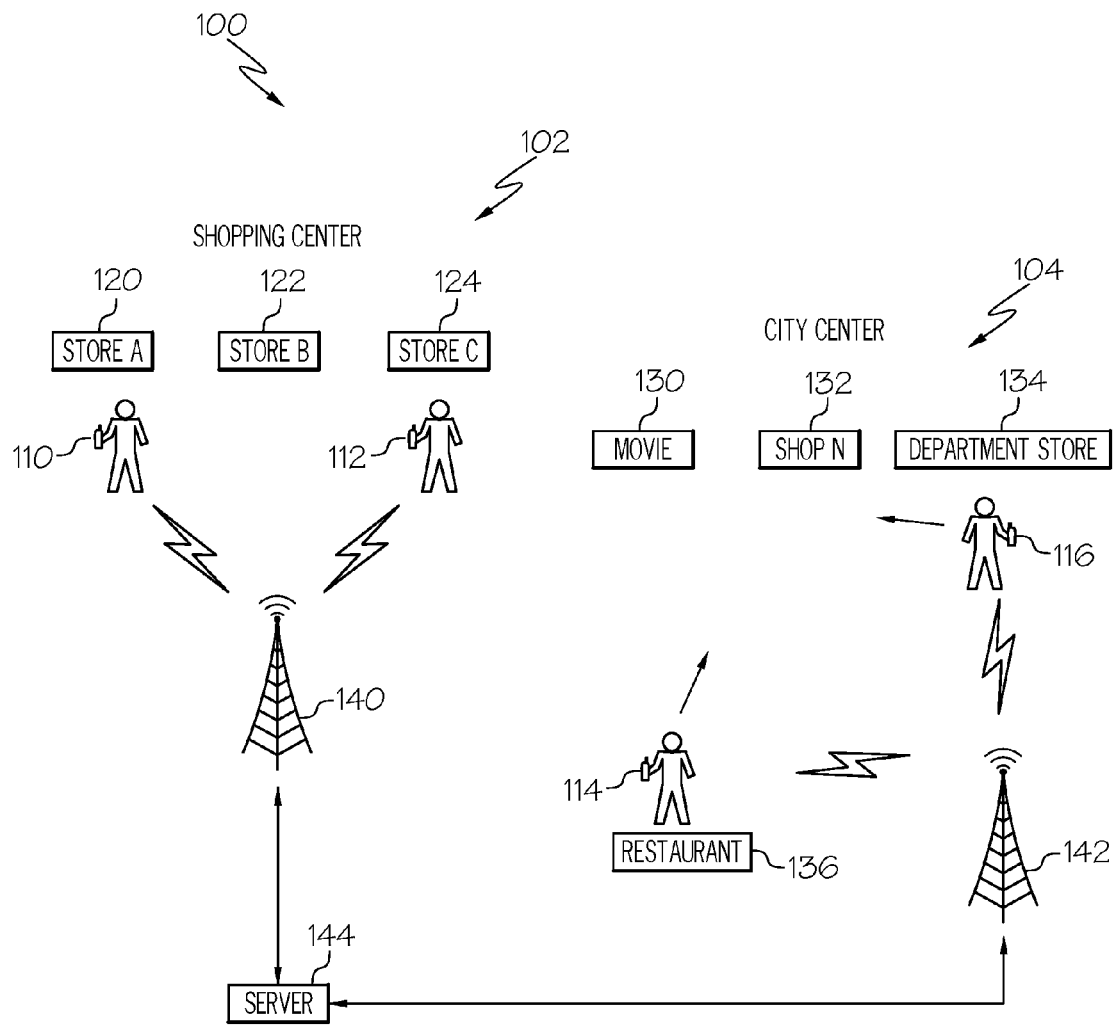
FIG. 1 illustrates a geographic environment, in accordance with one example.

FIG. 1 illustrates a geographic environment 100, according to an example. The geographic environment 100 in this example includes two commercial areas, a shopping center 102, and a downtown city center 104 that includes a number of retail and other consumer oriented businesses. A relatively small number of stores, retail and other consumer oriented businesses are shown in this geographic environment 100 in order to more concisely describe relevant aspects of the operation of the described systems and methods. As is generally understood, such shopping centers and city centers are able to have a large number and a large variety of businesses and other venues that are able to be spread over a generally large geographic area in a variety of configurations over that area.

In the illustrated geographic environment 100, the shopping center 102 includes a store A 102, a store B 122, and a store C 124. In this depiction, these three stores are shown in a line from left to right in the drawing, with store B 122 between store A 120 and store C 124, which are respectively at the ends of this line. A first user 110 and a second user 112 are shown in different areas of the shopping center 102. In the particular configuration of this illustration, the first user 110 is shown near store A 120, and the second user 112 is shown near store C 124.

The city center 104 includes movie 130, a shop N 132, a department store 134 and a restaurant 136. In this depiction, the movie 130, shop N 132 and department store 134 shown in a rough line from left to right in the drawing, with shop N 132 between the movie 130 and the department store 134, which are respectively at the ends of this line. The restaurant 136 is shown to be opposite the movie 130. A third user 114 and a forth user 116 are also shown in different areas of the city center 104. In particular, the third user 114 is shown to be close to the restaurant 136 and between the movie 130 and restaurant 136. The fourth user 116 is shown near the department store 134. An arrow near the third user 114 indicates that the user is in motion and moving towards the movie 130 and shop N 132, and therefore away from the restaurant 136. An arrow near the fourth user 116 shows that the fourth user 116 is moving in a direction generally towards the opposite end of the illustrated city center 104, and therefore generally towards the restaurant 136 and movie 130.

The users in the geographic environment 100 each have a respective user device that wirelessly communicates with a wireless communications infrastructure. In the illustrated geographic environment 100, the user's devices are able to wirelessly communicate with either a first wireless communications station 140 and/or a second wireless communications station 142. In general, the user's devices are able to communicate, either wirelessly or via a wired connection, through any suitable communications interface. In various examples, user devices used by any of the first user 110, the second user 112, the third user 114, the fourth user 116, or any combinations of these, are able to communicate via cellular data services, short range wireless links such as Wi-Fi®, Bluetooth®, any suitable technique, or combinations of these. In the illustrated example, the user devices communicate with a server 144 through one or both of the first wireless communications station 140 or the second wireless communications station 142. In various examples the server 144 is able to consist of a server, any suitable cloud computing infrastructure, or combinations of these.

The server 144 in an example is a cloud computing platform that includes functions to perform lifecycle management of apps on the user devices used by each of the four users depicted in the geographic environment 100. These apps in an example are able to include apps that allow the user to receive information relevant to the stores, retail businesses, or other consumer based businesses that likely to be of interest to the particular user of the respective user's devices. In an example, the server 144 operates to install, manage operations of, support operations of, uninstall, perform other lifecycle maintenance for, or combinations of these, the apps on user devices associated with each of the depicted users.

Figure 2:
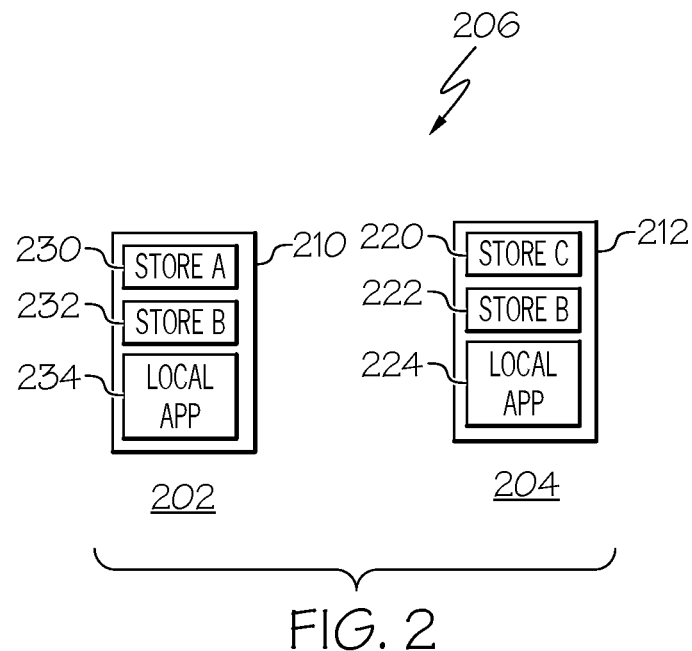
FIG. 2 illustrates two example shopping center area user device displays, according to an example.

FIG. 2 illustrates two example shopping center area user device displays 200, according to an example. The two example shopping center area user device displays 200 depict a first display 202 and a second display 204. The first display 202 shows example icons displayed on a display of the device of the first user 110 when that user is in the location in the shopping center 102 shown in FIG. 1. The second display 204 shows example icons displayed on a display of the device of the second user 112 that user is in the location in the shopping center 102 shown in FIG. 1. The first display 202 and the second display 204 each depict a display of app icons for apps where some of those icons have been selected to be displayed on the respective devices based on a context determined for that device, which is assumed to be a context associated with the user of that device.

The depicted icons are examples of user interface elements associated with apps that are able to be used in conjunction with the user device. The icons illustrated in the two example shopping center area user device displays 200 include two types of icons, virtual icons and local icons. Virtual icons in one example include user interface elements that are associated with and that therefore represent sever based apps. A user is able to use a server based app in one example by selecting the virtual icon associated with the selected app. The selection of an icon is able to be made by any suitable technique, such as by touching a touch sensitive screen in the vicinity of the display of the icon. Examples of server based apps include cloud based apps that operate by at least partially performing some functions on a remote processor, and those functions are able to interact with user interfaces that are presented on the user's device.

Virtual icons in one example are able to be managed by a virtual icon manager that operates on a remote server. In an example, the virtual icon manager is implemented by processing performed within a cloud computing infrastructure. The virtual icon manager in some examples is able to add icons to the display of a user's device, determine positions at which to place each icon on the display of the user's device, control operation of server based apps and the interaction with user interfaces operating on the user's device, remove virtual icons from the display of the user's device, or combinations of these. In some examples, the virtual icon manager is able to manage the lifecycle of server based apps on the user's device, where those server based apps are represented by virtual icons provided by to the user's device by the virtual icon manager.

In addition to the virtual icons, the two example shopping center area user device displays 200 depict user device displays that include local app icons. Local app icons in an example are icons associated with apps that are installed on the user's device and which primarily execute on the user's device. In some examples, local icon apps are associated with apps that include apps installed under the control of the user of the device.

The first display 202 includes two virtual icons that were selected based on the context of the device used by the first user 110. As described above, the first user 110 is in the vicinity of Store A 120, and also near Store B 122. As shown in FIG. 1, Store C 124 is further from the first user 110 at that time. Because the first user 110 is closest to Store A 120 and Store B 122 and is further from store C 124, the first display 202 has a first icon 230 that is associated with a server based app for Store A 120 and a second icon 232 that is associated with a server based app for store B 122. In addition to using the device's context to select which icons to display on the first display, the locations on the user's device display of these icons is also determined based on the context of the user's device. For example, the first icon 230 representing a server based app for Store A 120 is placed above on the second icon 232 representing a server based app for store B 122 because the user is located closer to Store A 120 than Store B 122. In the illustrated example, the two virtual app icons are placed above a first local app icon 234, although any other placement and arrangement is able to be determined by the remote server.

The second display 204 also includes two virtual icons that were selected based on the context of the device used by the second user 112. As described above, the second user 112 is in the vicinity of Store C 124, and also near Store B 122. As shown in FIG. 1, Store A 120 is further from the second user 112 at that time. Because the second user 112 is closest to Store C 124 and Store B 122 and is further from Store A 120, the second display 204 has a third icon 220 that is associated with a server based app for Store C 124 and a fourth icon 222 that is associated with a server based app for store B 122. In addition to using the device's context to select which icons to display on the first display, the locations on the user's device display of these icons is also determined based on the context of the user's device. For example, the third icon 220 representing a server based app for Store C 124 is placed above on the fourth icon 222 representing a server based app for store B 122 because the user is located closer to Store C 124 than Store B 122. In the illustrated example, the two virtual app icons are placed above a second local app icon 224, although any other placement and arrangement is able to be determined by the remote server.

Figure 3:
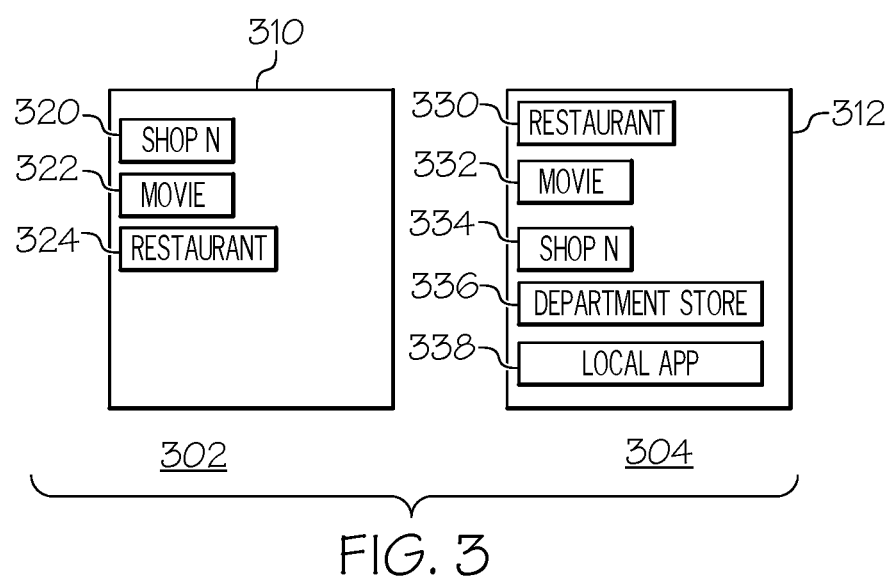
FIG. 3 illustrates example city center shopping area user device displays, according to an example.

FIG. 3 illustrates example city center shopping area user device displays 300, according to an example. The example city center shopping area user device displays 300 depicts a third display 302 and a fourth display 304. The third display 302 shows example icons displayed on a display of the device of the third user 114 when that user is in the location in the city center 104 shown in FIG. 1. The fourth display 304 shows example icons displayed on a display of the device of the fourth user 116 when that user is in the location of the shopping area in the city center 104 shown in FIG. 1. As is similarly displayed for the two example shopping center area user device displays 200, the third display 302 and the fourth display 304 each depict a display of app icons for apps where some of those icons have been selected to be displayed on the respective devices based on a context determined for that device, which is assumed to be a context associated with the user of that device.

The icons displayed in the example city center shopping area user device displays 300 are similar to those discussed above with regards to the example city center shopping area user device displays 300. For example the city center shopping area user device displays 300 include virtual icons, which represent server based apps, and local icons that represent apps locally installed on the device. As is discussed above, the virtual icons in some examples are able to be managed by the above described virtual icon manager.

The third display 302 includes three virtual icons that were selected based on the context of the device used by the third user 114. As described above, the third user 114 is close to the restaurant 136 and between the movie 130, and the restaurant 136. In this illustrated example, the third user 114 is shown by an arrow to be moving away from the restaurant 136 and towards Shop N 132. The illustrated third display 302 includes virtual icons that are selected based not only on the location of the third user 114, but also based on the movement of the third user 114. Because the third user 114 is moving towards Shop N 132, the third display presents a third display first virtual icon 320 at the top of the presented icons as was selected to be an icon associated with a virtual app for Shop N 132. The virtual icon selected to be displayed and positioned below the top icon is a third display second virtual icon 322 that is associated with an app for the movie 130.

Although the third user 114 is closer to the restaurant 136 than the Store N 132, or movie 130, the third user 114 as shown in FIG. 1 is moving away from the restaurant 136 and towards those other two locations. Because the third user 114 is close to the restaurant 136, a third display third virtual icon 324 is displayed in this example at the bottom of the third display 302 where the third display third virtual icon 324 is associated with a server based app associated with the restaurant 136. The virtual icon for the restaurant 136 is shown at the bottom of the virtual icons because it is determined in this example to be of less interest to the third user 114 given the third user's movement away from that location. In further examples, a virtual icon associated with the restaurant may be placed more prominently on a display based on other factors, such as the display being presented near a customary meal time for the third user, based on a preference of the third user for the particular restaurant 136 or a chain of restaurants to which restaurant 136 may belong, based on other factors, or combinations of these.

The fourth display 304 includes two virtual icons that were selected based on the context of the device used by the fourth user 116. As described above, the fourth user 116 is in the vicinity of the department store 134, but moving towards the opposite end of the city center 104 and thus more towards the movie 130 and restaurant 136. In addition to the context of the user device based on the device's location, additional information is used in this example to determine the set of virtual icons and their display locations on the fourth display 304. In this example, information gathered from the personal calendar for the fourth user 116, which is available to one or both of the user device used by the fourth user 116 and the cloud based virtual icon manager, indicates that the fourth user 116 is scheduled to meet a friend in a few minutes. Because the fourth user 116 is scheduled meet a friend, the cloud based virtual icon manager in an example selects virtual icons for server based apps that are appropriate for meeting friends, such as a restaurant 136 or movie 130. Locations less likely to be of interest when meeting friends, such as Shop N 132 or Department Store 134 are given less priority in selecting virtual icons to present to the user.

The fourth display 304 has a fourth display first virtual icon 330 that is an icon associated with an app for the restaurant 136. Below that is a fourth display second virtual icon 332 that is an icon associated with a server based app for the movie 130. Below these two virtual icons on the fourth display 304 is a fourth display third virtual icon 334, which in this example is for a server based app associated with store N 132, and a fourth display fourth virtual icon 336, which in this example is for a server based app associated with the department store 134. In this example, the icon for a server based app associated with Shop N 132 is selected to be shown above the icon for the department store 134 based on the movement of the fourth user 116 towards the Shop N 132, even though the fourth user 116 is closer to the department store 134. The fourth display 304 further includes a local app icon, a fourth display first local icon 338 and a fourth display second local icon 338. As discussed above, the local app icons are associated with apps installed on the user's device. In further examples, the any arrangement of virtual icons and local icons is able to be specified, including intermingling local icons with virtual icons on the display.

Figure 4:
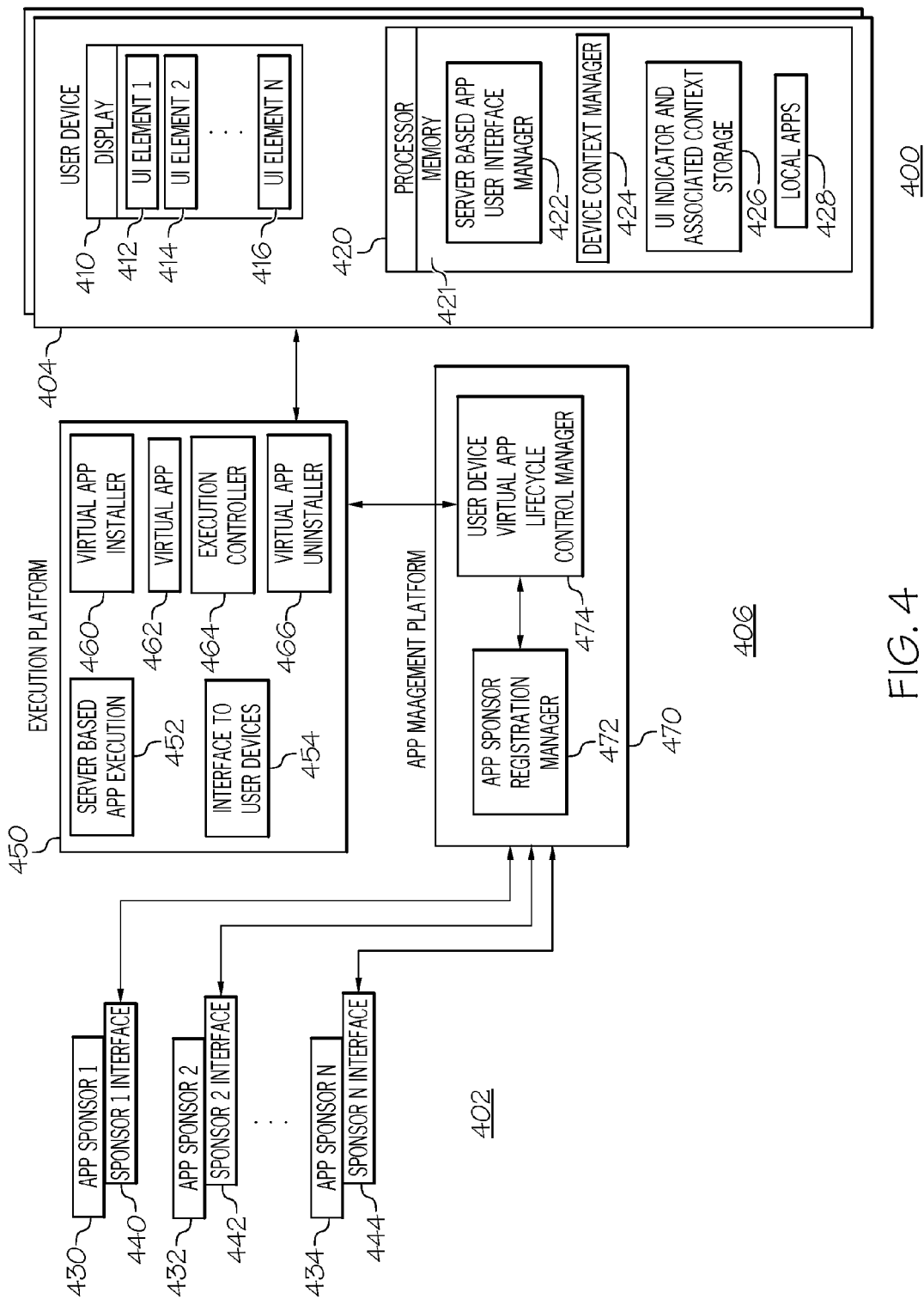
FIG. 4 illustrates cloud based app management and deployment environment, according to an example.

FIG. 4 illustrates a cloud based app management and deployment environment 400, according to an environment. The illustrated cloud based app management and deployment environment 400 depicts three fundamental components, a sponsor component 402, a cloud infrastructure component 406, and user devices 404. As described below, these components interact with each other to deliver and maintain a relevant set of virtual icons on a user's device to allow the user to use server based apps that are relevant to the context of the user.

The sponsor component 402 includes a number of app sponsors, such as app sponsor 1 430, app sponsor 2 432, and app sponsor N 434. These app sponsors in some examples include operators of retail and other businesses, such as are discussed above in FIG. 1. For example, the operators of the stores in the shopping center 102 and the shops, stores, movies and restaurants in the city center 104 are each able to individually control one or more apps associated with a business that a user is able to use to receive information from, or otherwise interact with, that particular business.

Each app sponsor has a corresponding sponsor interface, such as the sponsor 1 interface 440, sponsor 2 interface 442, and sponsor N interface 444. These interfaces in one example include a cloud computing platform interface, such as an Internet Web browser or other computer communications program. In an example, one or more centrally located terminals or other user interface devices are able to be located in the vicinity of several sponsors, such as in an office of the shopping center 102 or a management office for the city center 104. These interfaces in an example allow a user, such as a person working for the particular app sponsor, to provide information to, and otherwise control or interact with, the cloud based computing platform that operates to provide certain cloud based apps deployed to the user devices 404. In an example, the app sponsors are able to dynamically register or unregister one or more server based apps to enable or disable to server based app to be available for deployment to devices in the user devices 404, otherwise configure, or control the server based app to present desired information, perform desired processing, or otherwise configure the server based app, or otherwise control the server based app's operation and deployment to user devices.

The user devices 404 include multiple user devices, such as the illustrated user devices 404. The user devices 404 are representative of any suitable user device, such as a smart phone, personal digital assistant (PDA), other devices used by individuals, or any other suitable device. The user devices 404 include a display 410 on which data, images, text, other visual information, or combinations of these, are presented. The illustrated display 410 includes a User Interface (UI) element 1 412, UI element 2 414, and a UI element N 416. In an example, these UI elements are icons presented on the display 410 of a user device in the user devices 404. Each of these UI elements, such as each icon, is associated with a particular app that is available for use by the user of a user device within the user devices 404. In an example, the display 410 is a touch sensitive display that allows a user to provide input by touching particular areas of the display 410. In an example with a touch sensitive display, a user is able to initiate operation of an app by touching, or otherwise selecting, a particular UI element on a touch sensitive display and an app associated with that UI element will start and provide a corresponding user interface to the user to use that selected app. In various examples, the UI elements are able to be associated with local apps, which have at least one component installed on the user devices 404, or server based apps that include processing operating on a cloud based server and that interact with user interface elements provided on the user devices 404.

The user devices 404 of one example includes a processor 420 and memory 421. The processor 420 executes programs defined by applications stored in the memory 421. In an example, the memory 421 is able to store data defining programs or apps such as a server based app user interface manager 422, a device context manager 424, and one or more local apps 428. The server based app user interface manager 422 is an executable program in some examples that controls the display of virtual icons associated with server based apps on the display 410. The device context manager 424 in one example monitors indications of the user device context and reports relevant information regarding the present user device context to the cloud infrastructure component 406. Additionally, the memory 421 is able to store one or more local apps 428 that are apps executed by the processor 420 of the user device.

The memory 421 further includes a user interface indicators, locations and associated context storage 426. The user interface indicators, locations and associated context storage 426 in one example, stores a number of user interface indicators, such as icons, for virtual apps that correspond to server based apps. In addition to user interface indicators for one or more server based apps, the user interface indicators, locations and associated context storage 426 in some examples stores locations at which those user interface indicators, such as icons, are to be displayed on the display 410. Additionally, the user interface indicators, locations and associated context storage 426 is able to store specifications of the user devices contexts in which certain server based apps are to be displayed on the display 410. For example, a particular server based app is able to specify that its icon is to be displayed when the user device is within a specified geographic location.

The cloud infrastructure component 406 includes an app management platform 470 and an execution platform 450. The app management platform 470 and the execution platform 450 in an example are provided on a cloud based infrastructure that allows the virtual access of all of their functions via a suitable communications network. Although the app management platform 470 and the execution platform 450 are each shown as one element that are in communications with one another, the actual realization of these function is sable to have any structure in a cloud computing infrastructure.

The app management platform 470 includes an app sponsor registration manager 472. The app sponsor registration manager 472 interacts with app sponsors within the app sponsor component 402, such as via the sponsor interfaces described above, to configure the server based apps for deployment to and use on the user devices 404. In an example, the app sponsor registration manager 472 allows a sponsor of a server based app, such as a store owner or other promoter of a business, to register or unregister one or more of that sponsor's server based app in order to enable or disable one or more of that sponsor's server based app to be available to client devices. In an example, the app sponsor registration manager 472 allows app sponsors to setup installers and uninstallers to install or uninstall the sponsor's server based apps onto user devices. The app sponsor registration manager 472 in some examples further allows an app sponsor to upload, configure, otherwise manipulate, or combinations of these, the server based apps that are provided through, and that execute on, the cloud based infrastructure for use by users, such as via a user interface provided on the user devices 404. In some examples, the app sponsor registration manager 472 allows the app sponsor to specify device context related conditions that control when a User Interface element, such as an icon, associated with a particular server based app is to be loaded onto or removed from a particular user device within the user devices 404.

The app management platform 470 further includes a user device virtual app lifecycle control manager 474. The user device virtual app lifecycle control manager 474 controls the user interface elements provided to, removed from, otherwise altered or manipulated, or combinations of these, from the user devices 404. In an example, the app lifecycle control manager 474 invokes install and uninstall scripts to install or remove user interface elements, such as icons, onto the user device for selected server based apps. In some examples, the app lifecycle control manager 474 also loads or removes appropriate parameters for each installed or uninstalled user interface element, such as parameters for installing a representation of the server based app, transferring an icon image and information used to identify the server based app as part of the installation process of the virtual app onto the user device.

In some examples, the app lifecycle control manager 474 further monitors context related information for each user device, and determines which user devices satisfy context related conditions specified for installation of, removal of, modification of, other modifications of, or combinations of these, one or more server based apps. As discussed above, an app sponsor is able to specify context related conditions cause a virtual app to be installed on to a user device when the context of that user device satisfies those specified conditions. In one example, the app lifecycle control manager 474 receives various data from the app sponsor registration manager 472 to define server based apps to deploy to various user devices, to define the associated contexts in which to deploy certain server based apps, to specify other operational information, or combinations of these. The app management platform 470 in one example receives app related information and data such as the above described information and data provided by the app sponsors from the app sponsor registration manager 472.

In addition to, or in place of, conditions specified by an app sponsor, other device context related conditions are able to be specified by any suitable source. For example, context related conditions are able to be based on fixed geographical locations. In an example, the app lifecycle control manager 474 is able to be configured with one or more geographic locations associated with each server based app where the geographic locations correspond to a geographic vicinity near each store or other facility that is associated with the server based app. In such an example, each user device reports its present location to the app lifecycle control manager 474. The app lifecycle control manager 474 then compares the present location of each user device with the location related context conditions specified for each server based app. When the present location of a user device satisfies the location based context for a server based app, and also satisfies any other context based conditions for that server based app, the app lifecycle control manager 474 then operates to cause a user interface element to be installed onto the user device for the server based app whose context related conditions have been satisfied.

The execution platform 450 in one example includes the cloud based components that manage and support the operation and deployment of server based apps, also referred to as virtual apps, in conjunction with user devices 404. The execution platform 450 includes a virtual app storage 462 that stores executable software executed within the cloud based infrastructure to perform the functions provided by server based apps. The execution platform further includes a virtual app installer 460 that manages the installation of virtual apps onto user devices. In an example, installation of a particular virtual app onto a user device includes sending a definition of an icon associated with the particular server based virtual app to the user device, along with information identifying the server based app that allows the user device to exchange information with and otherwise inter-operate with the server based app executing on the cloud based infrastructure. The execution platform 450 further includes a virtual app uninstaller 466 that manages de-installation of virtual apps from user devices. In an example, the virtual app uninstaller 466 communicates with the user device to cause icons for apps to be removed when the context specifications for those apps are no longer satisfied by the context of the user device.

The execution platform 450 includes a server based app execution component 452. The server based app execution component 452 implements the processing to perform the functions of the server based apps supported by the cloud infrastructure component 406. The server based app election component 452 in an example operates with an interface to user devices 454 to exchange user interface data with the user interfaces provided on the user devices 404 with which each server based app executing via the server based app execution component 452.

Figure 5:
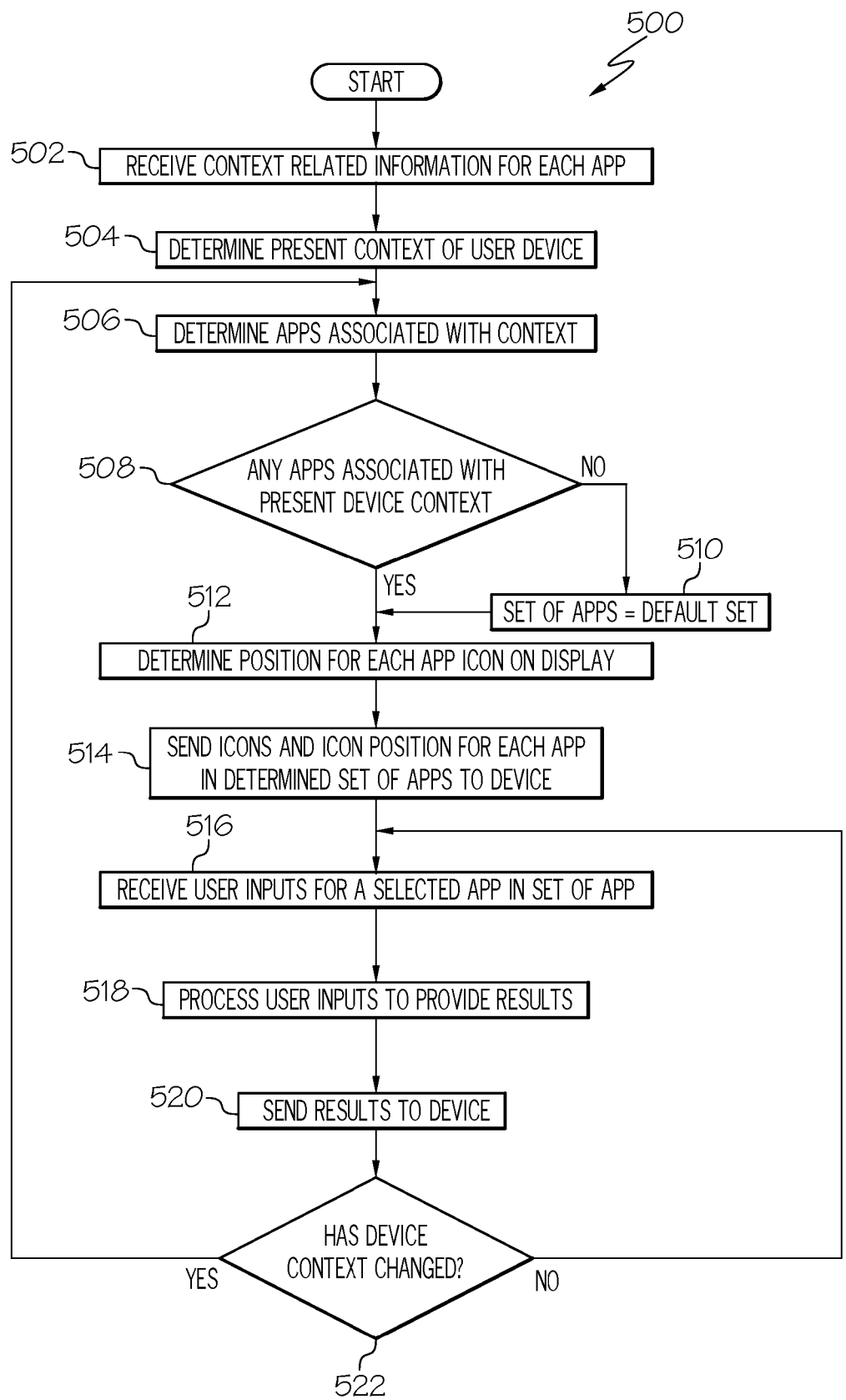
FIG. 5 illustrates a present device context app management platform process, according to an example.

FIG. 5 illustrates a present device context app management platform process 500, according to an example. The present device context app management platform process 500 illustrates an example process flow performed by a cloud infrastructure component 406 as discussed above. The illustrated present device context app management platform process 500 receives information from a user device that conveys the present context of the user's device. Based on that present context, the present device context app management platform process 500 determines selected virtual apps to be presented to the user of the user device, conveys icons for those selected virtual apps to the user device, and supports operation of those selected virtual apps by performing the processing associated with each of the selected virtual apps the user of the user device is using. In an example, the present context includes not only a location of the user's device, but other information such as ambient temperature, speed and direction of movement, other information, or combinations of these. In an example, the present device context app management platform process 500 is performed on a cloud based infrastructure and interacts with user interface elements provided on the user device. In general, many instances of the illustrated present device context app management platform process 500 are able too operate to support many user devices or multiple virtual apps operating contemporaneously on a particular user device.

The present device context app management platform process 500 begins by receiving, at 502, context related information for each server based app. In an example, this context related information is received from the sponsor of each server based app. In general, each server based app is able to have an associated specification of context related conditions that control when the server based app is presented to a user of a user's device.

The present device context app management platform process 500 continues by determining, at 504, a present context of the user's device. This present context in one example is determined based upon context related information that is determined and reported by a user device. The context related information in other examples are able to be determined, reported, or both, by any suitable technique either operating on the user device or by monitoring that is separate from the user device. In an example, the present context is a context at a first timepoint that is sufficiently close to the present time such that the reported context is relevant to the user of the user device. The present context in an example is determined by assembling the received context related information into a form to facilitate comparison to specified context related conditions for each app. In an example, determining the user device context is able to be based on any context status associated with the user device, such as the user device location, user device movement, user device communications status, user device communications history, social media contacts for a user of the user device, social media activities of a user of the user device, physiological information of a user associated with the user device, calendar entries for a user of the user device, preferences of a user of the user device, or information within a profile of a user of the user device, or combinations of these.

The present device context app management platform process 500 determines, at 506, a set of server based apps that are associated with the determined present context for the user device. This determination in an example is based upon a comparison of the received context related information for each server based app and the determined present context of a user device.

A determination is then made, at 508, if any server based apps are determined to be associated with the determined present context of the user device. In an example, server based apps are associated with the determined present context of the user device when the received context related information matches the context related conditions specified for the server based app.

If it is determined that there are no server based apps associated with the present device context, the set of server based apps is set to a default set of server based apps, at 510. In an example, the default set of server based apps is defined to be no server based apps. In further examples, the default set of server based apps is defined to be a set of server based apps that are considered to be of general interest to users regardless of the context of the user device.

After determining the set of server based apps as either server based apps associated with the present context or as a default set, the present device context app management platform process 500 determines, at 512, a position in the display to be presented on the user device for each virtual icon associated with each server based app in the determined set of server based apps. The determined position is able to be specified as positions relative to other virtual icons, relative to other virtual icons and local app icons, as positions relative to local app icons, as absolute locations on the display, as any suitable location specification, or as any combination of these.

Icons and a specification of the determined location on the display for each icon for each server based app within the set of server based apps are sent to the device, at 514. These icons are then displayed by the user device. A user of the user device is able to select an icon by any suitable technique, and begin access to a server based app associated with the icon selected by the user. In various examples, once a user selects an icon for a particular server based app, a user interface for the selected server based app is presented on the user device. This user interface for the selected server based app is able to be provided alone with the icon associated with that server based app, or the present device context app management platform process 500 is able to send such user interface definitions based on receiving an indication of a user input selecting the icon.

The present device context app management platform process 500 receives, at 516, user inputs for a selected app in the set of apps. In some examples, these user inputs are able to include an input to select an icon for a particular server based app as well as other user inputs to the user interface associated with the selected server based app. Based on these received user inputs, the present device context app management platform process 500 processes the user inputs to produce results. These results are able to include, for example, a different user interface to present to the user on the display of the user device, information to be presented to the user on the user interface device, any other type of result, or combinations of these.

The present device context app management platform process 500 sends, at 520, these results to the user device. In general, these results are presented to the user on a visual, audio, or other output device and are able to allow further inputs to be received from the user.

A determination is then made, at 522, if the device context has changed. This determination is able to be based upon receiving context related information from the user receiving information from any other source, or combinations of these, as is discussed above with regards to determining the present context of the user device, at 504. In an example, determining if the device context has changed includes determining a second context of the user device at a second timepoint, where that second timepoint is subsequent to the first timepoint at which the user device context was determined, at 504.

If the device context has not changed, the present device context app management platform process 500 returns to receiving, at 516, user inputs as is described above. If the device context has changed, the present device context app management platform process 500 returns to determining, at 506, server based apps that are associated with this new context and continues with the subsequent processing described above.

Figure 6:
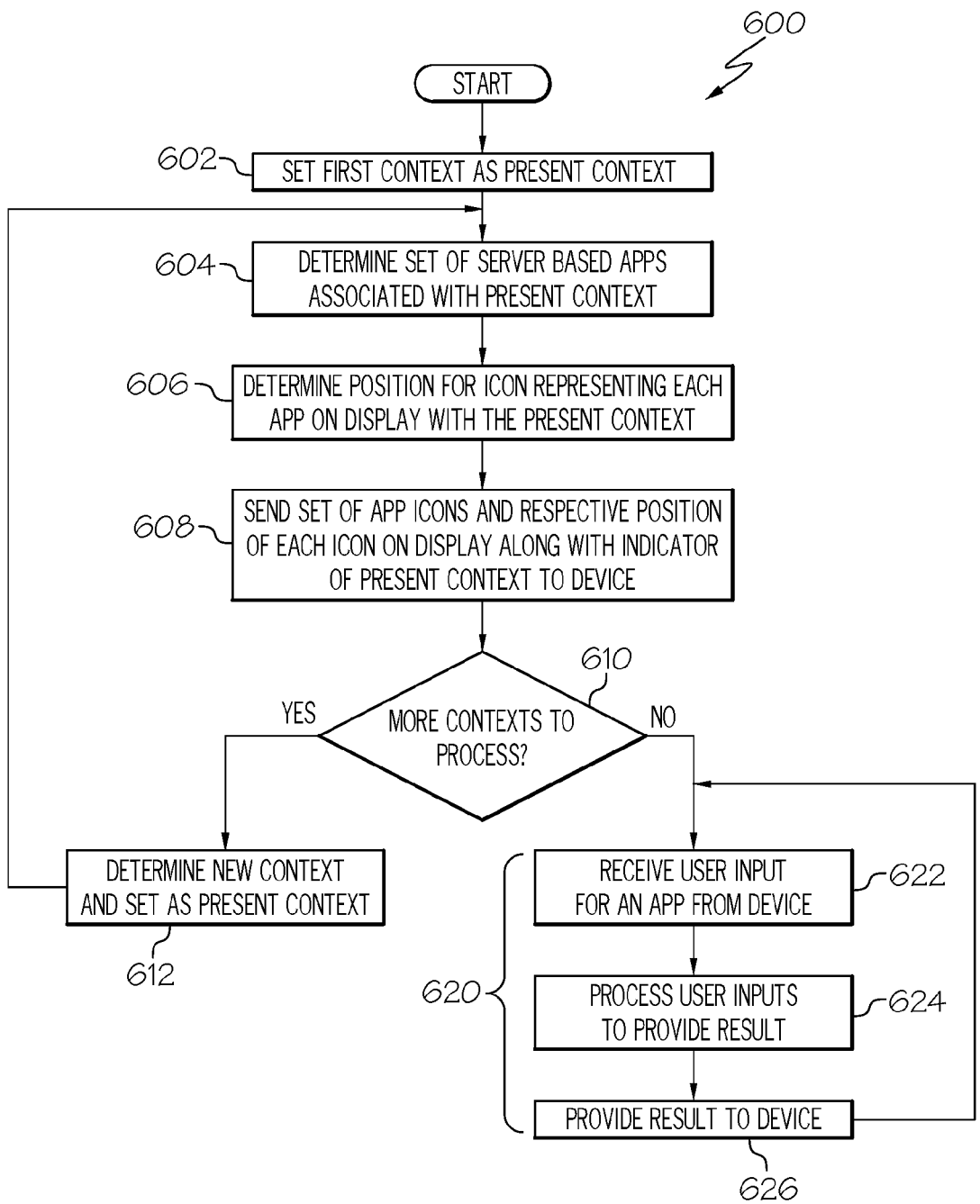
FIG. 6 illustrates a multiple device contexts app display definition process, according to an example.

FIG. 6 illustrates a multiple device contexts app display definition process 600, according to an example. The multiple device contexts app display definition process 600 is similar to the present device context app management platform process 500 discussed above but determines multiple sets of server based apps, where each set of server based apps includes server based app icons and associated information for each of multiple device contexts. These multiple sets of server based apps are sent, along with a definition of each associated context, to the user device. This allows the user device to autonomously determine and present relevant virtual app icons based on the context of the user device as determined at the user device.

The multiple device contexts app display definition process 600 begins by setting, at 602, a first context as a present context. As discussed above, each server based app is able to have an associated specification of context related conditions that controls when the server based app is presented to a user of a user's device. The multiple device contexts app display definition process 600 determines or defines sets of context related conditions for a number of server based apps for a number of defined contexts. In one example, theses sets of context related conditions for a number of server based apps are created at a time prior to sending those sets of context related conditions user devices. In this manner, the user device is able to compare stored sets of context related conditions and if the context related conditions of one of those sets is satisfied by a present context of that user device, icons for server based apps associated with the matched set of context related conditions can be displayed by the user devices 404 independent of interaction with the cloud infrastructure component 406.

The contexts defined by the multiple device contexts app display definition process 600 are able to be selected based on any suitable criteria. For example, in the above described example depicted in FIG. 1, a set of geographic locations within the shopping center 102 are able to be defined such that each context in the set of defined contexts corresponds to being near each store within the shopping center 102. In one example, setting this first context as a present context corresponds to determining a first context of a user device at a first timepoint. In this example, the first timepoint corresponds to a time in the future at which the user device will satisfy the conditions for this first context, and thus result in the display of associated icons, as is described below.

The multiple device contexts app display definition process 600 determines, at 606, a set of server based apps that are associated with the present context for the user device. The multiple device contexts app display definition process 600 determines, at 606, a position in the display to be presented on the user device for each virtual icon associated with each server based app in the determined set of server based apps. The determined position is able to be specified as positions relative to other virtual icons, relative to other virtual and local app icons, as positions relative to local app icons, as absolute locations on the display, as any suitable location specification, or as any combination of these.

Icons and a specification of the determined location on the display for each icon for each server based app within the set of server based apps are sent to the device, at 608. In general, these icons and associated data are stored on the user device and when the user device determines its context matches one of the determined contexts, the set of server based apps is then displayed to the user of the user device.

A determination is made as to whether more contexts are to be processed, at 610. If more contexts are to be processed, a new context is determined and set as the present context, at 612. In an example, this iteration of determining a new context is an example of determining a second context at a second timepoint that is after the first timepoint. In this example, the second timepoint is the timepoint at which the context of the user device satisfies the context conditions for a subsequently determined set of server based apps. If it is determined that no more contexts are to be processed, user inputs associated with a server based app are received and processed, at 620.

In an example, the multiple device contexts app display definition process 600 receives, at 622, user inputs for a selected app in the set of apps. In some examples, these user inputs are able to include an input to select an icon for a particular server based app as well as other user inputs to the user interface associated with the selected server based app. Based on these received user inputs, the multiple device contexts app display definition process 600 processes, at 624, the user inputs to produce results. These results are able to include, for example, a different user interface to present to the user on the display of the user device, information to be presented to the user on the user interface device, any other type of result, or combinations of these.

The multiple device contexts app display definition process 600 sends, at 626, these results to the user device. If the device context has not changed, the multiple device contexts app display definition process 600 returns to receiving, at 622, user inputs as is described above. It is noted that the user input reception and processing 620 in this example is performed independently of an indication of the context of the user device being provided to the server based app, or to the cloud infrastructure component 406 discussed above.

Figure 7:
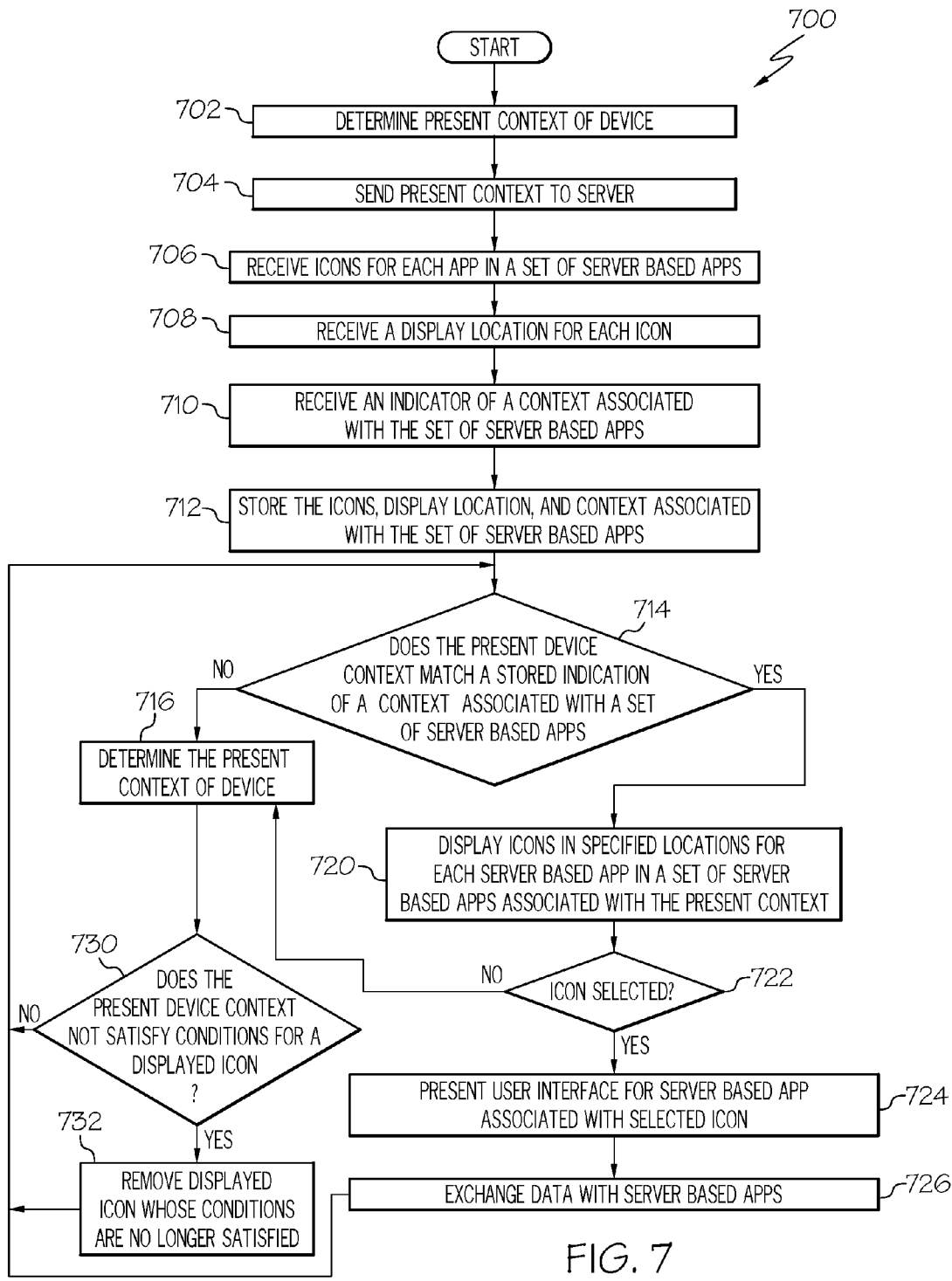
FIG. 7 illustrates a user device process, according to an example.

FIG. 7 illustrates a user device process 700, according to an example. The user device process 700 is an example of a process performed by a processor 420 within a user device within the user's devices 404 as is described above. In an example, the user device process 700 includes processing defined by the server based app user interface manager 422. The user device performing the user device process 700 in some examples is able to be a mobile device, such as a mobile phone, cellular phone, cellular smart phone, other mobile device, any other suitable device, or combinations of these.

The user device process 700 beings by determining, at 702, a present context of the user device. The present context is able to include, for example, the present location of the user device, a speed and direction of movement of the user device, a state or history of voice communications (such as phone usage) of the user device, preferences or other information stored within a profile of a user of the user device, activities of a user associated with the user device as determined by, for example, social circles and activities, physiological parameters of the user, calendar, other context parameters, or combinations of these.

The user device process 700 sends, at 704, in one example the determined present context to a server. In some examples, the server, such as within a cloud based infrastructure, is able to respond to the determined context of the user device and provide, modify, remove, or combinations of these, based on the present context of the user device as determined by the user device and reported to the cloud based infrastructure.

The user device process 700 receives, at 706, icons for each app within a set of server based apps. In some example, these icons are examples of user interface elements that can be displayed to a user of the user device. In some examples, processing within a cloud based infrastructure determines which apps to include within the set of server based apps are selected based upon the present context of the user's device. The processing within the cloud based infrastructure then sends icons for each app within the set of server based apps to the user device.

The user device process 700 in some examples receives, at 708, a location for display each icon within the received icons for each app within the set of server based apps. The location at which to display each icon is able to be determined by processing within a cloud based infrastructure in order to, for example, place more relevant icons at the top of the display of virtual icons. In some examples, the location at which to display each of these virtual icons is able to be specified relative to local icons for locally installed aps on the user's device so that virtual icons and local icons are able to be interleaved on the display presented to the user of the user device.

The user device process 700 in some examples receives, at 710, an indication of a context associated with the set of server based apps for which associated icons were received.

This indication of context allows processing within the user device to determine if the present context of the user device matches the context associated with the set of server based apps, and therefore the icons associated with the set of server based apps should be displayed on the display of the user device.

The received icons, display location, and context associated with the set of server based apps are stored, at 712. Storing these data allows subsequent processing by the user device to determine if the user device enters a context that satisfies contexts for a set of server based apps. Upon such as determination, the user device is then able to retrieve and display the icons associated with the set of server based apps whose context conditions are satisfied by the device's context, such as is described below. Storing these context indications allows reducing the amount of data transmitted between the user device and the cloud computing infrastructure.

A determination is made in some examples as to whether the present device context matches a stored indication of a context associated with a set of server based apps, at 714. If such a match is not determined, the user device process 700 determines, at 716, the present device context and returns to the determination, at 714. In some examples, the newly determined present device context is also sent to a server, as is described above. In some examples, a server receiving the new device context is able to send additional icons to the user device, at which point the user device will display those icons as described above.

In some examples, after determining the present device context, at 716, a determination is made, at 730, as to whether the present device context does not satisfy conditions for an icon that is displayed on the display of the user device. If the present device context does not satisfy conditions for an icon that is displayed on the display of the user device, that displayed icon whose conditions are no longer satisfied is removed, or uninstalled, at 732 from the presentation on the user display. If it is determined that the present device context does satisfy conditions for the icons displayed on the user device display, or after icons whose conditions are no longer satisfied are removed or uninstalled, the user device process 700 returns to determining, at 714, if the present device context matches a stored indication of a context, and performs the above described subsequent processing.

If it is determined, at 714, that the present device context matches a stored indication of a context associated with a set of server based apps, the user device process 700 displays, at 720, icons in specified location for each server based app in a set of server based apps associated with the present context. Once these icons are displayed, a user is able to select a server based app by selecting one of the displayed icons. In some examples, the display of icons for server based apps is able to be interleaved with icons for apps stored on the user device. The equipment used to display the icons in one example is able to be a display of a mobile device, such as a cellular telephone or smart phone. In some examples, the icons for the server based apps are displayed in a default pane of the display of the device. This default pane is able to also include icons for locally installed apps or other apps or functions able to be accessed or used by a user of the device displaying the icons.

A determination is made, at 722, if an icon is selected. In an example, a user is able to select an icon by pressing a touch sensitive display of the user device in the vicinity of a display of the icon of the desired server based app. Such an icon selection in one example is able to be made by a single interaction, such as a single click, single touch, or single tap of the icon displayed on the user's device. If it is determined that an icon is not selected, the user device process 700 determines, at 714, if the present device context matches a stored indication of a context, and performs the above described subsequent processing.

If it is determined that an icon is selected, the user device process 700 presents, at 724, a user interface for a server based app associated with the selected icon. In an example, the user interface for a selected server based app is able to be provided by the cloud based infrastructure, the user interface is able to be stored on the user device, or the user interface is able to be obtained through any suitable technique.

The user device process 700 then exchanges, at 726, data with the selected server based app. In an example, the user interface provided by the user device accepts user inputs and forwards those inputs the selected server based app, such as an app operating on the execution platform 450 discussed above. The server based app is then able to determine results, either based on or independent of the user inputs, and provide those results to the user device for display to the user, such as via a user interface provided for that server based app on the user device. The user device process 700 then returns to determining, at 714, if the present device context matches a stored indication of a context, and performs the above described subsequent processing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
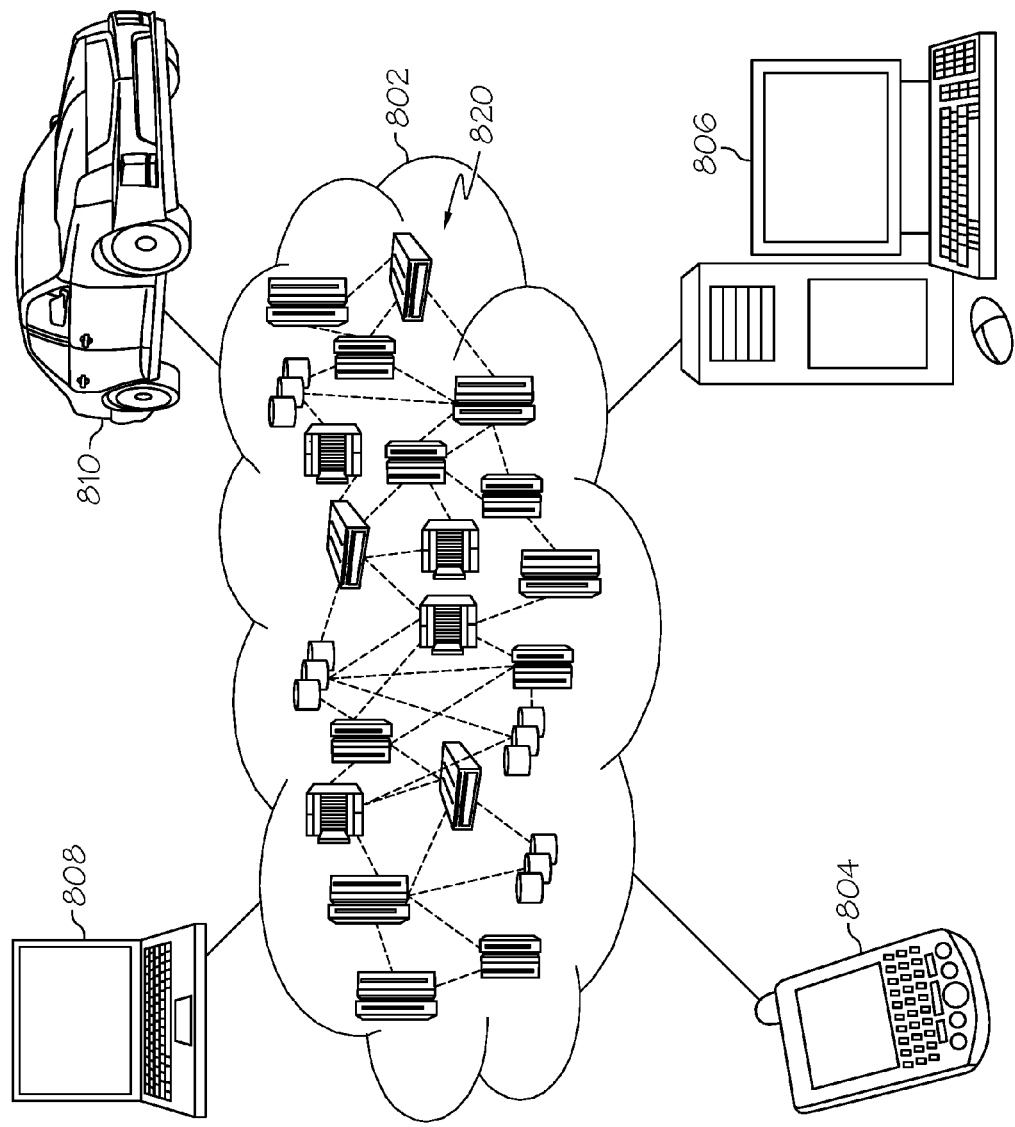
FIG. 8 depicts a cloud computing environment according to an embodiment of the present invention.

Referring now to FIG. 8, illustrative cloud computing environment 802 is depicted. As shown, cloud computing environment 802 comprises one or more cloud computing nodes 820 with which local computing devices used by cloud consumers, such as, for example, personal digital assistant (PDA) or cellular telephone 804, desktop computer 806, laptop computer 808, and/or automobile computer system 810 may communicate. Nodes 820 may communicate with one another. They may be grouped (not shown) physically or virtually, in one or more networks, such as Private, Community, Public, or Hybrid clouds as described hereinabove, or a combination thereof. This allows cloud computing environment 802 to offer infrastructure, platforms and/or software as services for which a cloud consumer does not need to maintain resources on a local computing device. It is understood that the types of computing devices 804-810 shown in FIG. 1 are intended to be illustrative only and that computing nodes 820 and cloud computing environment 802 can communicate with any type of computerized device over any type of network and/or network addressable connection (e.g., using a web browser).

Figure 9:
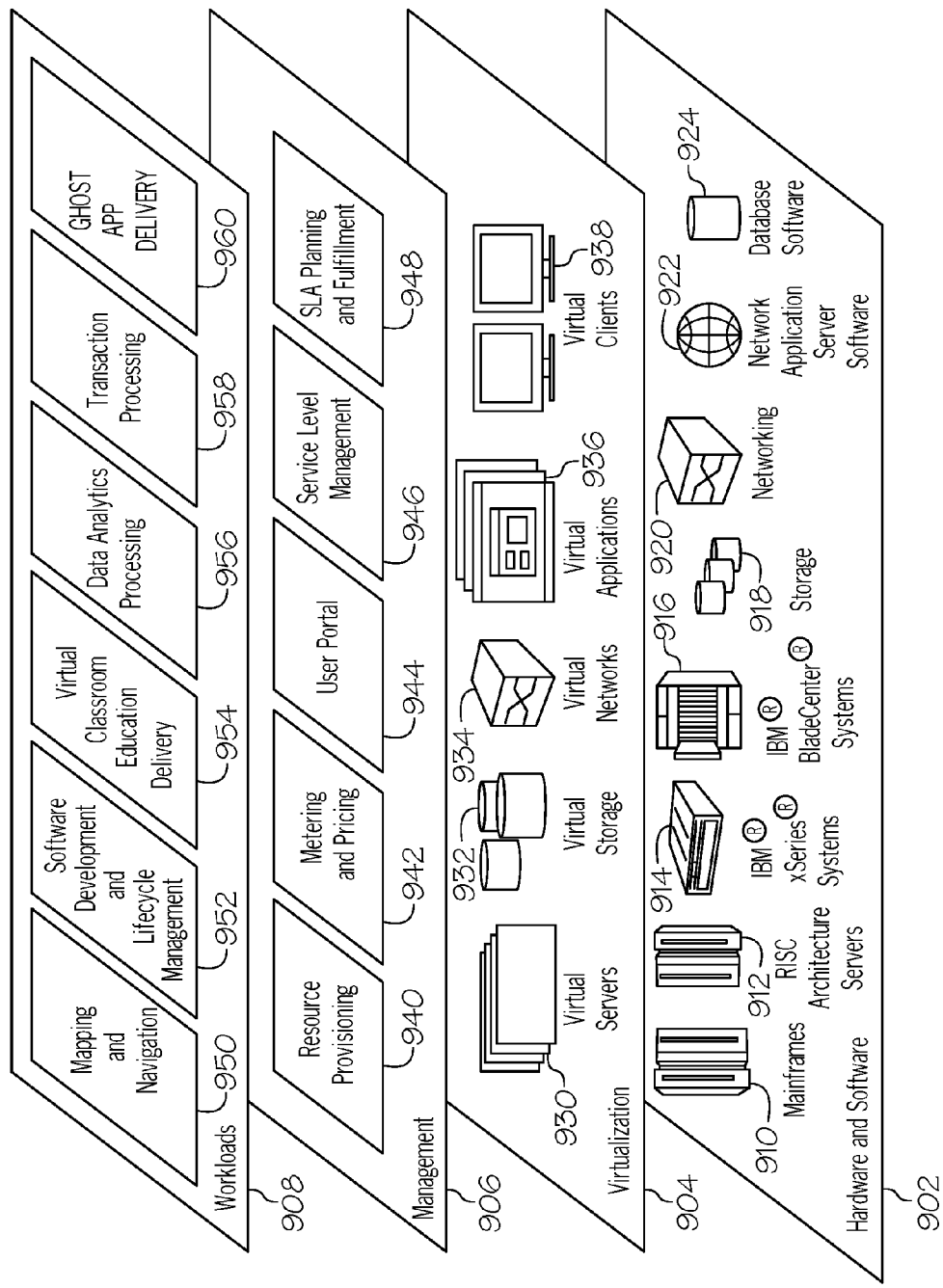
FIG. 9 depicts abstraction model layers according to an embodiment of the present invention.

Referring now to FIG. 9, a set of functional abstraction layers provided by cloud computing environment 802 (FIG. 1) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 902 includes hardware and software components. Examples of hardware components include: mainframes 910; RISC (Reduced Instruction Set Computer) architecture based servers 912; servers 914; blade servers 916; storage devices 918; and networks and networking components 920. In some embodiments, software components include network application server software 922 and database software 924.

Virtualization layer 904 provides an abstraction layer from which the following examples of virtual entities may be provided: virtual servers 930; virtual storage 932; virtual networks 934, including virtual private networks; virtual applications and operating systems 936; and virtual clients 938.

In one example, management layer 906 may provide the functions described below. Resource provisioning 940 provides dynamic procurement of computing resources and other resources that are utilized to perform tasks within the cloud computing environment. Metering and Pricing 942 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 944 provides access to the cloud computing environment for consumers and system administrators. Service level management 946 provides cloud computing resource allocation and management such that required service levels are met. Service Level Agreement (SLA) planning and fulfillment 948 provide pre-arrangement for, and procurement of, cloud computing resources for which a future requirement is anticipated in accordance with an SLA.

Workloads layer 908 provides examples of functionality for which the cloud computing environment may be utilized. Examples of workloads and functions which may be provided from this layer include: mapping and navigation 950; software development and lifecycle management 952; virtual classroom education delivery 954; data analytics processing 956; transaction processing 958; and ghost app server 960.

Information Processing System

Figure 10:
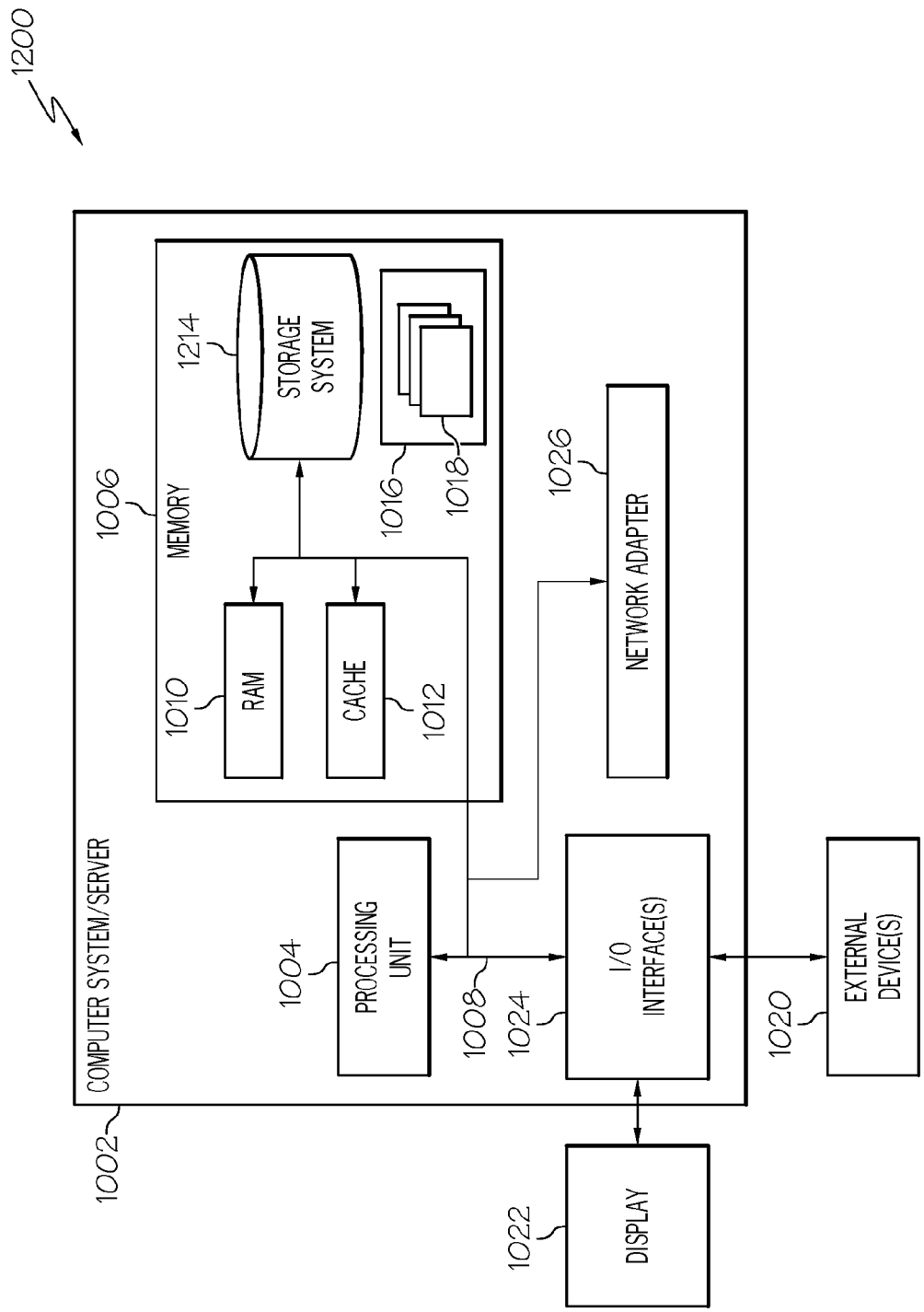
FIG. 10 is a block diagram illustrating one example of an information processing system according to one example.

Referring now to FIG. 10, this figure is a block diagram illustrating an information processing system that can be utilized in various examples of the present disclosure. The information processing system 1002 is based upon a suitably configured processing system configured to implement one or more embodiments of the present disclosure. Any suitably configured processing system can be used as the information processing system 1002 in embodiments of the present disclosure. In another embodiment, the information processing system 1002 is a special purpose information processing system configured to perform one or more embodiments discussed above. The components of the information processing system 1002 can include, but are not limited to, one or more processors or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1006 can also include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of various examples described above.

Program/utility 1016, having a set of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of the above described processes and systems.

The information processing system 1002 can also communicate with one or more external devices 1020 such as a keyboard, a pointing device, a display 1022, and the like. The information processing system 1002 is further able to communicate with one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method on a server, the method comprising:
   determining a first context for a user's device, the first context being a context of the user's device at a first timepoint and comprises:
      at least one physiological parameter of a user of the user's device; and
      a location of the user device;
   determining, based on the first context and a respective set of context related conditions defined for each server based app within a plurality of server based apps, a first set of server based apps associated with the first context, the first set of server based apps comprising a first server based app and a second server based app, wherein a first location of a first sponsor of the first server based app is closer to the location of the user device than a second location of a second sponsor of the second server based app;
   determining, based on the first context and the respective set of context related conditions defined for server based app within the plurality of server based apps, a first display position for a respective indicator of the first server based app and a second display position for the respective indicator of the second server based app, wherein the first display position is above the second display position based on the first location being closer to the location of the user device than the second location;
   sending, in association with an indication of the first context, a respective indicator of a respective user interface element for each server based app within the first set of server based apps;
   sending to the user's device, based on determining the first display position and the second display position, an indication of the respective display position for the respective indicator of the respective user interface element for at least one server based app within the first set of server based apps;
   receiving, at a server from the user's device based on sending the respective indicator, user interface inputs associated with a selected user interface for a selected app within the first set of server based apps;

processing, based on receiving the user interface inputs, the user interface inputs to produce results based on the user interface inputs;

sending, based on the producing, the results;

determining that one or more context related conditions of the respective set of context related conditions defined for at least one of the server based app from the first set of server based apps fails to be satisfied; and removing the respective indicator for the at least one of the server based app from the user's device.

2. The method of claim 1, further comprising sending, in association with the respective indicator of the respective user interface element for each server based app within the first set of server based apps, an indication of the first context.

3. The method of claim 1, further comprising:

determining, based on the first context and the respective set of context related conditions defined for each server based app within the at least one server based app, a respective display position for the respective indicator of the respective user interface for at least one server based app within the first set of server based apps; and sending to the user's device, based on determining the respective display position, an indication of the respective display position for the respective indicator of the respective user interface for at least one server based app within the first set of server based apps.

4. The method of claim 1, wherein determining the first context is based on context related information received from the user's device.

5. The method of claim 1, wherein determining the first context is based on at least one of user device location, user device movement, user device communications status, user device communications history, social media contacts for a user of the user device, social media activities of a user of the user device, physiological information of a user associated with the user device, calendar entries for a user of the user device, preferences of a user of the user device, or information within a profile of a user of the user device.

6. The method of claim 1, further comprising:

determining a second context for the user's device, the second context being a context at a second timepoint after the first timepoint, the second context being a change in context from the first context;

determining, based on the second context and the respective set of context related conditions defined for each server based app within the at least one server based app, a second set of server based apps; and sending, to the user's device based on determining the second set of server based apps, an indication of the second context in association with a respective indicator of a respective user interface element for each app within the second set of server based apps.

7. The method of claim 1, wherein determining that the one or more context related conditions of the respective set of context related conditions defined for the at least one of the server based app fails to be satisfied comprises:

determining a second context for the user's device, the second context being a context at a second timepoint after the first timepoint, the second context being different from the first context; and determining that the second context does not satisfy a set of context related conditions associated with a particular app within the first set of server based apps.

8. The method of claim 1, further comprising:

receiving, from a sponsor of each app within the first set of server based apps prior to determining the first context, the respective set of context related conditions for the each app within the first set of server based apps, wherein determining the first set of server based apps associated with the first context comprises comparing the first context for the user's device to each respective set of context related conditions for each app within the first set of server based apps.

9. The method of claim 8, further comprising:

determining a second context for the user's device, the second context being a context at a second timepoint after the first timepoint, the second context being different from the first context;

determining that the second context does not satisfy any set of context related conditions associated with any app within the first set of server based apps; and sending to the user's device, based on determining that the second context does not satisfy any set of context related conditions for each app within the first set of server based apps, an indication to present a default set of apps.

10. A method on a user device, the method comprising:

determining a present user device context, the present user device context comprising:

at least one physiological parameter of a user of a user device; and a location of the user device;

receiving, from a remote processor, a respective indicator of a respective user interface element associated with each respective server based app within a first set of server based apps, each respective indicator indicating a user interface element to display for selection of its associated server based app;

receiving, at the user device from the remote processor and in association with the first set of server based apps, a respective indication of a device context defined for a plurality of server based apps comprising a first server based app and a second server based app, wherein a first location of a first sponsor of the first server based app is closer to a present location of the user device than a second location of a second sponsor of the second server based app;

determining that the present user device context matches the respective indication of a device context;

receiving, from the remote processor, a first display position for a respective indicator of the first server based app and a second display position for a respective indicator of the second server based app, wherein the first display position is above the second display position based on the first location being closer to the location of the user device than the second location;

displaying, based on receiving the respective indicator and based on determining that the present user device context matches the respective indication of a device context, the respective user interface element associated with each server based app within the first set of server based apps wherein the respective indicator for the first server based app is displayed at the first display position, and the respective indicator for the second server based app is displayed at the second display position based on the respective indication of a device context defined for each server based app within the first set of server based apps;

receiving, based on displaying the respective user interface element, a selection of a selected user interface element that is associated with a selected server based app, the selected server based app executing on the remote processor and interacting with a user interface components of the user device;

presenting on a display of the user device, based on the selection, a user interface for the selected server based app; and exchanging with the remote processor, in conjunction with the user interface, information between the selected server based app executing on the remote processor and user interface components of the user device.

11. The method of claim 10 further comprising:

storing, in association with the indication of a device context, the respective indicator of the respective user interface element associated with each respective server based app within the first set of server based apps; and determining, after the storing, a change in a user device context to a new device context as the present device context, wherein the determining that the present user device context matches the indication of a device context is based on determining the change to a new device context.

12. The method of claim 10, wherein the present user device context comprises at least one of user device location, user device movement, user device communications status, user device communications history, social media contacts for a user of the user device, social media activities of a user of the user device, physiological information of a user associated with the user device, calendar entries for a user of the user device, preferences of a user of the user device, or information within a profile of a user of the user device.

13. The method of claim 10, further comprising:

determining a new present user device context;

determining that the new present user device context no longer matches the indication of the device context; and removing, based on determining that the new present user device context no longer matches the indication of the device context, the respective user interface elements associated with each server based app with in the first set of server based apps.

14. The method of claim 10, wherein the respective user interface element comprises an app icon.

15. The method of claim 10, wherein displaying the respective user interface element comprises displaying the respective user interface element on a display of a mobile device.

16. The method of claim 10, wherein the selection of a selected user interface element comprises at least one of a single click, a single tap, or a single touch of the respective user interface element.

17. The method of claim 10, further comprising:

receiving, for at least one app within the first set of server based apps, a respective display location for the respective indicator of a respective user interface element associated with each respective server based app within the first set of server based apps, the respective display location specifying a respective location on a display of a plurality of interface indicators on the user device, and wherein the displaying comprises displaying the respective indicator of a respective user interface element at the respective display location on a display of a plurality of interface indicators on the user device.

18. The method of claim 17, where in the respective display location comprises a location within a plurality of app interface indicators for installed apps that are installed on the user device and that execute on the device.

19. A device, comprising:

one or more processors;

memory;

a device context manager communicatively coupled to at least the one or more processors and memory, the device context manager, when operating, determines a present user device context; and an app user interface manager communicatively coupled to at least the one or more processor and memory, the app user interface manager, when operating:

receives, from a remote processor, a respective indicator of a respective user interface element associated with each respective server based app within a first set of server based apps, each respective indicator indicating a user interface element to display for selection of its associated server based app;

receives, from the remote processor and in association with the first set of server based apps, an indication of a device context defined for to a plurality of server based apps comprising a first server based app and a second server based app, wherein a first location of a first sponsor of the first server based app is closer to a present location of the user device than a second location of a second sponsor of the second server based app; and determines that the present user device context matches the indication of a device context;

determining, based on the present user device context and the respective indication of a device context defined for each server based app within the first set of server based apps, a first display position for a respective indicator of the first server based app and a second display position for a respective indicator of the second server based app, wherein the first display position is above the second display position based on the first location being closer to the location of the user device than the second location;

displays, based on receiving the respective indicator and based on determining that the present user device context matches the indication of a device context, the respective user interface element associated with each server based app within the first set of server based apps;

receives, based on a display of the respective user interface element, a selection of a selected user interface element that is associated with a selected server based app, the selected server based app executing on the remote processor and interacting with a user interface components of the user device;

presents on a display of the user device, based on the selection, a user interface for the selected server based app;

exchanges with the remote processor, in conjunction with the user interface, information between the selected server based app executing on the remote processor and user interface components of the user device;

receives, from the remote processor, a communication from the remote processing indicating that a current user device context fails to satisfy the indication of a device context; and removes, receiving the communication, the respective user interface elements associated with each server based app with in the first set of server based apps from the device.

20. The method of claim 1, where the user's device comprises a mobile device comprising a display that presents the respective indicator of the respective user interface element for each server based app within the first set of server based apps.

* * * * *